United States Patent
Di Berardo et al.

(10) Patent No.: US 8,808,431 B2
(45) Date of Patent: Aug. 19, 2014

(54) COMPACT INERTIAL GAS-LIQUID SEPARATION SYSTEM

(75) Inventors: Lorenzo Di Berardo, Teramo (IT); Paolo Andreussi, Pisa (IT); Alberto Ansiati, Prato (IT)

(73) Assignee: Eni S.p.A., Rome (IT)

( * ) Notice: Subject to any disclaimer, the term of this patent is extended or adjusted under 35 U.S.C. 154(b) by 248 days.

(21) Appl. No.: 13/380,311

(22) PCT Filed: Jun. 21, 2010

(86) PCT No.: PCT/IB2010/001513
§ 371 (c)(1),
(2), (4) Date: Mar. 8, 2012

(87) PCT Pub. No.: WO2010/150078
PCT Pub. Date: Dec. 29, 2010

(65) Prior Publication Data
US 2012/0180661 A1     Jul. 19, 2012

(30) Foreign Application Priority Data
Jun. 26, 2009  (IT) .............................. MI2009A1136

(51) Int. Cl.
*B01D 19/00* (2006.01)

(52) U.S. Cl.
USPC .................. 95/258; 95/261; 96/189; 96/209; 96/188

(58) Field of Classification Search
USPC ............. 95/258, 261; 96/189, 209, 210, 211, 96/212, 188
See application file for complete search history.

(56) References Cited

U.S. PATENT DOCUMENTS

| | | | |
|---|---|---|---|
| 1,344,146 A * | 6/1920 | Peck | 55/459.1 |
| 2,401,079 A * | 5/1946 | Jones et al. | 96/157 |
| 2,705,053 A * | 3/1955 | Morris | 96/212 |
| 3,007,542 A * | 11/1961 | Giampapa et al. | 95/261 |
| 4,053,291 A * | 10/1977 | Sims | 96/209 |
| 4,187,087 A * | 2/1980 | Whitescarver | 95/247 |
| 4,760,742 A * | 8/1988 | Hatton | 73/861.04 |
| 5,526,684 A * | 6/1996 | Liu et al. | 73/200 |
| 7,569,098 B2 * | 8/2009 | Oglesby | 95/253 |
| 2005/0060970 A1 * | 3/2005 | Polderman | 55/320 |
| 2005/0066637 A1 * | 3/2005 | Gramme | 55/456 |
| 2005/0218088 A1 * | 10/2005 | Gonzalez et al. | 210/788 |
| 2008/0216656 A1 | 9/2008 | Gramme | |
| 2010/0147773 A1 * | 6/2010 | Kouba et al. | 210/747 |

FOREIGN PATENT DOCUMENTS

WO    03 066195    8/2003
WO    2005 023396  3/2005

OTHER PUBLICATIONS

International Search Report Issued Oct. 5, 2010 in PCT/IB10/001513 filed Jun. 21, 2010.

* cited by examiner

*Primary Examiner* — Duane Smith
*Assistant Examiner* — Douglas Theisen
(74) *Attorney, Agent, or Firm* — Oblon, Spivak, McClelland, Maier & Neustadt, L.L.P.

(57) ABSTRACT

A compact inertial gas-liquid separator including: a stratification mechanism including a first horizontal pipe and a second pipe having a larger diameter possibly slightly tilted with respect to the horizontal, for example of $\leq 10°$, connected to each other by a suitable connection gate; a cylindrical body with a vertical development, on which the stratification mechanism is tangentially inserted, wherein the inertial gas-liquid separation is performed, in whose upper part an arrangement of finishing elements can be optionally inserted for further separation of drops of liquid entrapped in the gaseous stream; two outlets for the liquid stream and for the gaseous stream.

6 Claims, 3 Drawing Sheets

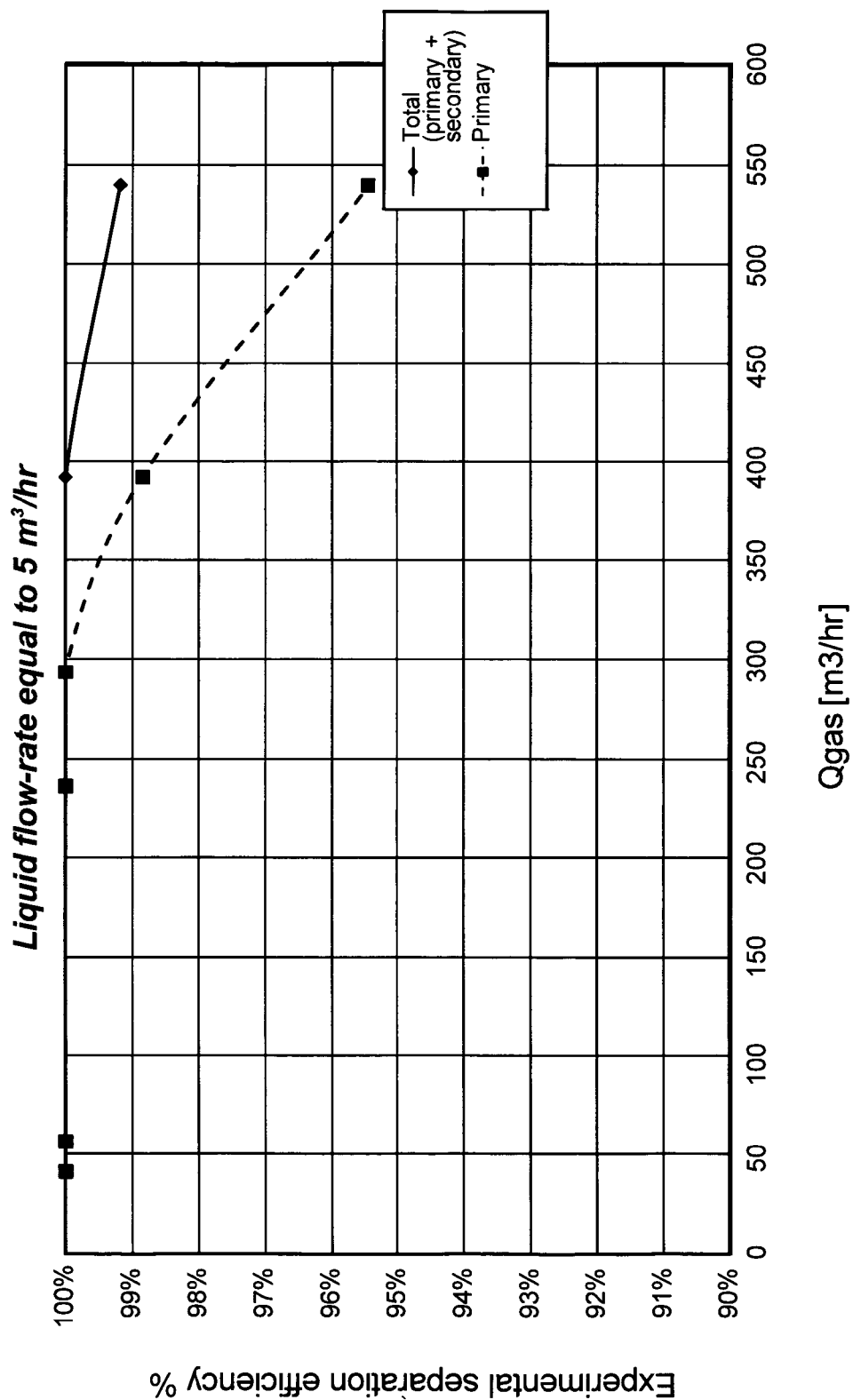

COMPACT INERTIAL GAS-LIQUID SEPARATION SYSTEM

The present invention relates to a compact inertial separation system of a gas-liquid mixture and the relevant separation method.

More specifically, the present invention relates to a compact separator, suitable for the separation of multiphase hydrocarbon streams, based on the combination of two distinct effects.

The separation of the liquid phase from the gaseous phase specifically takes place by:
deceleration of the incoming stream which causes a first stratification effect;
impact of the fluid at a low velocity on the walls of the separator, combined with the inertial separation effect between the liquid phase and the gaseous phase.

An additional effect for removing the drops of liquid entrapped in the gaseous stream is based on the principle of centrifugal separation or by coalescence.

The conventional separators used in the oil industry mainly consist of gravitational separation systems. These separators generally consist of large-dimensioned chambers in which the mixture of fluids resides for the time required to allow the separation of the two phases of the mixture to take place under the effect of gravitational force.

These chambers are characterized by considerable weight and dimensions, are difficult to adapt to off-shore production platforms and whose cost can significantly influence the costs of off-shore structures.

Alternatively, for the separation of gas from crude oil, separators based on the application of centrifugal force have been used, for example by the use of cyclones assembled in series, as described in Canadian patent 1,093,017, or in complex configurations as described in Canadian patent 1,136,061. Not even these installations, however, due to their encumbrance, are optimum for applications on off-shore platforms.

In order to reduce these disadvantages, technology is directed towards the development of compact separation systems, also interesting for applications in harsh environments such as subsea, arctic or down-hole environments, and which could potentially gradually replace gravitational separators also for on-shore applications.

Compact separation systems can also be adopted for partial separations between the phases (gas/liquid, liquid/liquid or fluid/solid). This can take place for a wide range of applications such as, for example, measurement or recompression systems, pipeline transportation, hydrate control, environmental and safety requirements.

An examination of technical literature leads to the conclusion that compact separation systems are normally considered as separators in which centrifugal force substitutes the force of gravity. The present analysis is limited to compact separation systems which do not have moving parts.

Compact gas-liquid separation systems based on the principle of centrifugal force and mostly used as finishing elements in the separation, utilize tubes equipped with blades (swirl tubes) which give a rotary motion to the fluid mixture, separating the gaseous phase from the liquid phase, as described in U.S. Pat. No. 4,566,883, in the name of Shell. More recently, Tea Sistemi has developed centrifugal separators based on the same principle, in which the geometry of the element which induces a rotary movement to the fluid (swirler) has been optimized, also allowing the use of a single unit having a large diameter as an alternative to various units having a small diameter, as described in international patent application WO 2007/129.276.

Some of the concepts adopted for the development of compact separation systems have also allowed the evolution of conventional gravitational separation systems such as compact gravitational separators developed by Shell. These separators can be horizontal or vertical. An example of a vertical compact cylindrical separator which uses a certain number of internal elements is proposed in international patent application WO 2005/023.396 A1, which, with the swirler, used as secondary gas-liquid separator, couples a pre-separation of the gas-liquid mixture through passage inside an inlet-vane.

Another example of a horizontal compact three-phase cylindrical separator is proposed in U.S. Pat. No. 6,537,458, in which the system is made more efficient by the use of a primary separator consisting of a plurality of swirl tubes or vane packs.

Together with centrifugal force and the force of gravity, an important role in gas-liquid separation can be played by inertial effects. These effects are at the basis of various types of liquid drop separators inside gaseous streams, available on the market. The liquid is separated from the gas by acceleration of the fluid stream through specific gates or orifices, on an impact surface which typically causes a sudden change of direction, determining the desired separation.

Examples of these devices can be found, for example, in European patent 1,068,890 B1 or more recently in International patent application WO 2008/134.227.

The correct exploitation of the inertial effects could play a fundamentally important role considering that the inertial effects of a slug or stratified liquid stream which passes through a pipeline, are significant.

Separation devices frequently used in the ambit of continuous monitoring systems of multiphase hydrocarbon streams, are equipped with an inlet pipe tilted with respect to the horizontal which allows separation by stratification of the gas-liquid mixture.

An example of these systems is described in U.S. Pat. No. 4,760,742 which envisages a pipe system for the separation of the gas bubbles entrapped in the liquid stream.

U.S. Pat. No. 5,526,684 discloses a compact separation system having a vertical development with a tangential inlet tilted downwards. The inclination of the inlet pipe, together with a convergent two-dimensional gate, on the one hand causes the partial stratification of the two phases and on the other, the acceleration of the fluid at the inlet and consequently of the vortical spiral of liquid downwards along the wall of the separator, the main resulting separation effect being the centrifugal force. The limit of the invention however lies in the fact that the centrifugal force requires high velocities of the fluid at the inlet of the separator, whereas the stratification of the flow takes place with low velocities of the mixture. The contradiction arising from contrasting effects which emerge in the above separation system can explain its low efficiency and applicability as partial separation system.

The objective of the present invention is to provide an apparatus and a compact gas-liquid separation method which essentially combines two effects:
stratification of the flow at the inlet of the separator; and
inertial separation of the liquid phase,
and is characterized in that the system is configured so as to efficiently also separate multiphase flows, for example slug flows, by significantly damping the liquid component of the stream, in the inlet pipe, a characteristic which allows a reduction in the height of the bottom of the separator and consequently its volume.

This objective is achieved with the compact gas-liquid separating apparatus according to the present invention comprising a stratification means, a cylindrical body with a vertical development and two outlet means for the gaseous stream and liquid stream. The present invention is described in the enclosed claims.

When held necessary, the system can be provided with optional complementary equipment for further separation, of liquid from the gaseous stream and gas and/or another liquid from the liquid stream, respectively.

Said stratification means essentially consists of two pipes mainly characterized by an enlargement of the section which allows a substantial reduction ($\geq 50\%$) in the velocity of the mixture at the inlet, this configuration, coupled with a possible slight downward inclination of the pipe ($\leq 10°$), allows the damping of the slug flow of the stream at the inlet and leads to stratified flow conditions.

Furthermore, as said inlet pipe is tangentially inserted on said cylindrical body, it ensures that, under the combined action of the relatively soft impact against the walls of the separator and the inertial force, the heavier liquid phase is conveyed towards the bottom of the separator, without an excessive fragmentation of the liquid stream being generated, whereas the bubbles of gas still entrapped in the liquid stream are released and, together with the gas already stratified, tend to rise centrally inside the main body (primary liquid separation) towards the upper part of the cylindrical body.

The fact that a possible slug flow stream at the inlet of the separator is damped, allows the bottom of the separator to have a reduced volume. In the upper part of the cylindrical body, the separation system can optionally comprise an arrangement of finishing elements for eliminating the liquid droplets entrapped in the gas such as mist extractors, wire mesh pads, vane packs, cyclones, swirler elements, etc. (secondary liquid separation).

The invention is particularly suitable for the separation of multiphase hydrocarbon streams and can be optimized at a project level in relation to the particular flow at the inlet by the use of a specific code for multiphase flow simulation MAST (Multiphase Analysis and Simulation of Transition), developed by TEA Sistemi, capable of capturing the dynamic variation between flow regimes (dynamic pattern recognition).

Further characteristics and advantages of the compact separation system according to the present invention will appear more evident from the following description of one of its embodiments, provided for illustrative and non-limiting purposes with reference to the enclosed drawings, in which.

Figure 2:
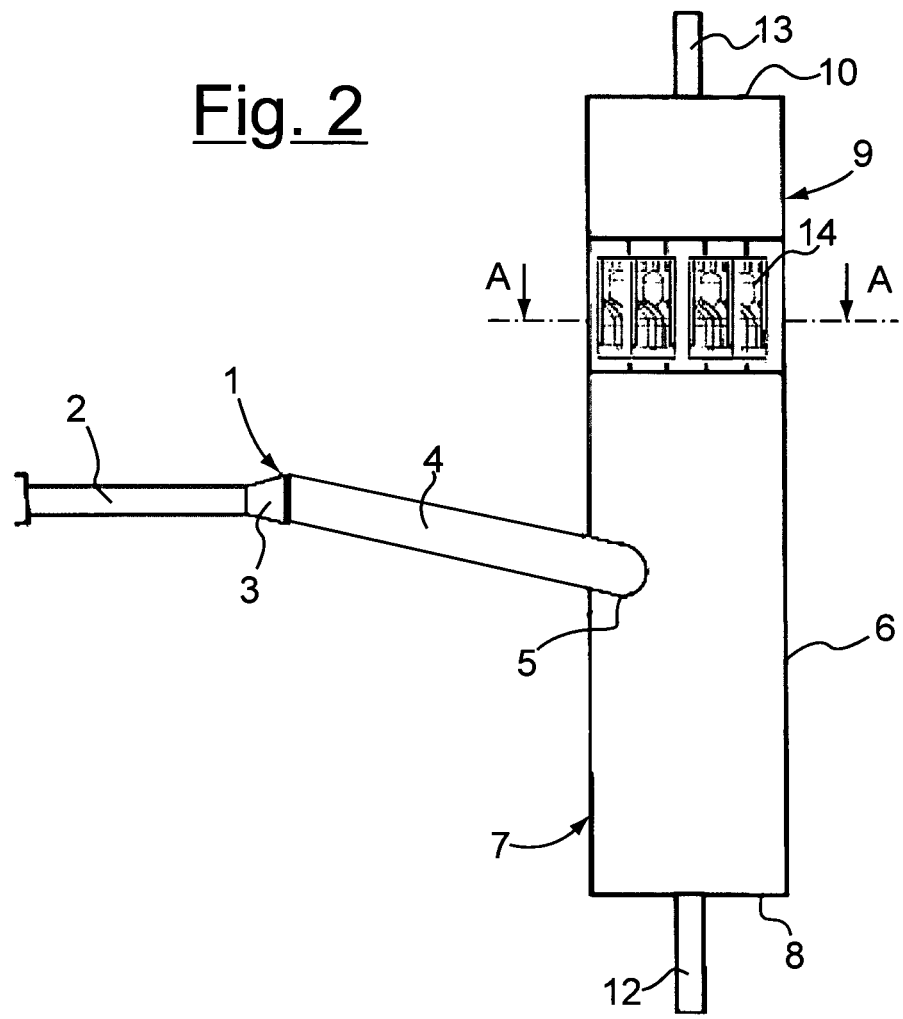
Figure 2A:
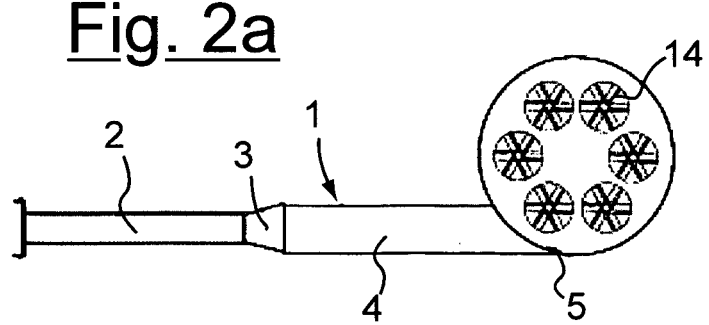

FIG. 2 provides a schematic representation of the compact inertial separator in which an arrangement of 6 swirler elements is installed as secondary separator;

FIG. 2a indicates the section A-A of FIG. 2;

FIG. 3 shows the experimental total separation efficiency (primary and secondary separation) and the primary separation efficiency relating to the system of FIG. 2 as a function of the gas flow-rate for a certain flow-rate of the liquid stream.

Figure 1:
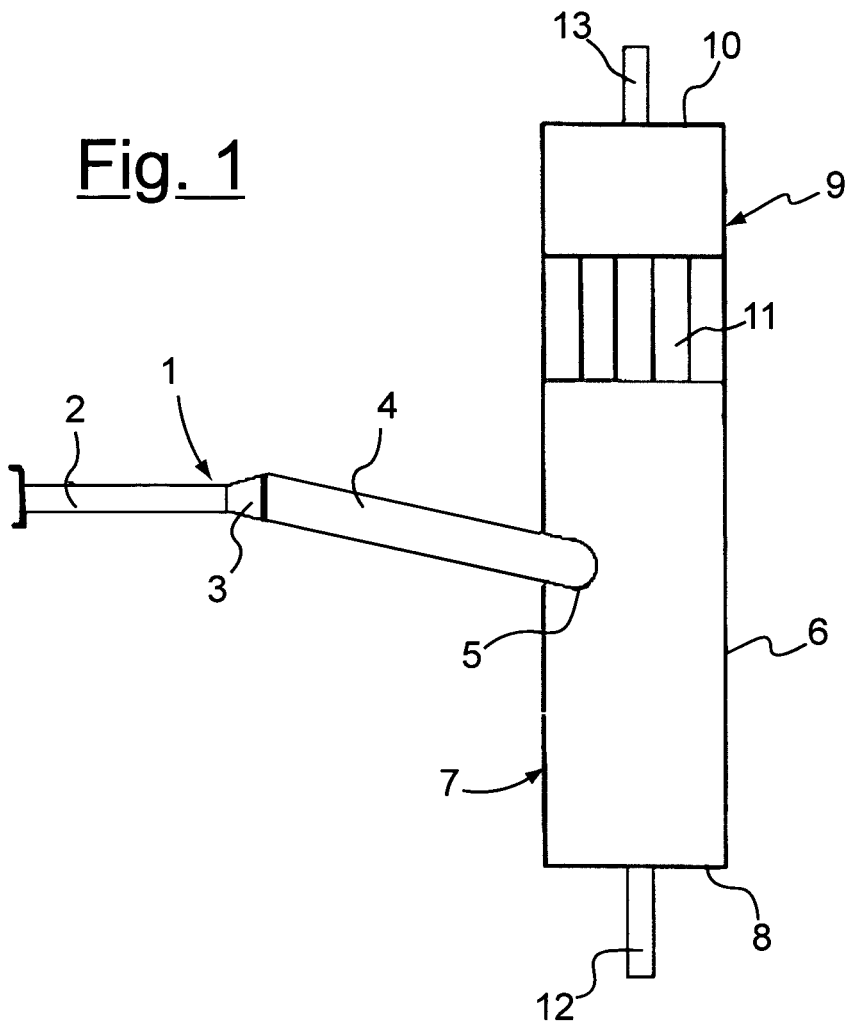
FIG. 1 shows a schematic representation of the compact inertial separator in which an optional generic secondary separator is installed.
Figure 1A:
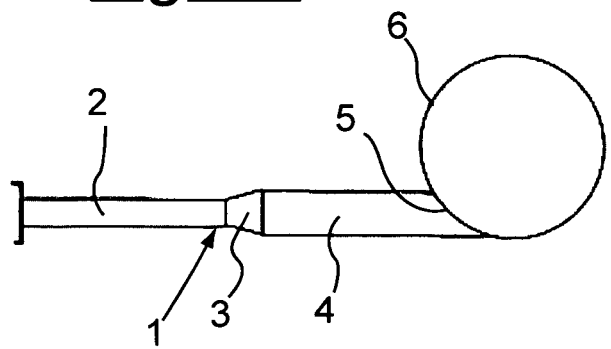
FIG. 1a illustrates a plan view of the inlet pipe showing its tangential connection to the body of the separator.

FIG. 1 illustrates the compact inertial gas-liquid separator, whose inlet means 1 consists of the two pipes 2 and 4 and a connection gate 3. The pipe 2, in which the multiphase fluid flows, coming for example from the production well, is horizontal. Said pipe 2 is connected by means of a suitable connection gate 3 to a pipe 4 having a larger diameter, which could be suitably slightly tilted with an inclination angle with respect to the horizontal $\leq 10°$. Said pipe 4 is tangentially inserted in correspondence with the inlet gate 5 of the cylindrical body 6 of the separator, as better illustrated in FIG. 1a. A stratification means is thus at a height with respect to a lower base 8, the height being a minimum which guarantees an efficient inertial separation of a stream already previously stratified in the stratification means. The cylindrical body 6 has a vertical extension and is ideally divided into a bottom 7 which extends between the lower base 8 of the cylindrical body and the inlet gate 5 and an upper part 9 which extends between the upper base 10 of the cylindrical body and the inlet gate 5. Inside said upper part of the separator 9, an arrangement of finishing elements 11 can be optionally positioned for the secondary liquid separation (e.g. mist extractors, wire mesh pads, vane packs, cyclones, swirler elements, etc.). The two outlet means consist of two outlet pipes of the liquid 12 and gas 13 which are respectively inserted on the lower base 8 and on the upper base 10 of the cylindrical body. It should be noted that the system, when deemed necessary, can also include two optional complementary separators (not shown in the representation of FIG. 1) located downstream of the outlet pipe of the liquid 12 and outlet pipe of the gas 13 for the further separation of gas and/or another liquid from the liquid stream and liquid from the gaseous stream, respectively.

The subsequent representation of FIG. 2 and FIG. 2a illustrates a specific configuration of the compact inertial gas-liquid separator. Most of the components to which reference is made are the same as those to which reference is made in FIG. 1 and are indicated with the same reference number. The configuration of FIG. 2 differs from that of FIG. 1 as inside the upper part of the separator 9, as secondary separator, an arrangement of 6 swirler elements 14 is positioned (international patent application WO 2007/129.276), symmetrical with respect to the axis of the cylinder, as better illustrated in FIG. 2a.

For illustrative purposes, FIG. 3, relating to the system of FIG. 2, shows the experimental total separation efficiency values (primary and secondary liquid separation) and the primary separation efficiency values referring to the liquid phase, as a function of the gas flow-rate ($30 \div 470$ m$^3$/h), for a flow-rate of the liquid stream equal to 5 m$^3$/h which enters with slug flow. It should be noted that the efficiency of the inertial separation system decreases slightly with an increase in the gas flow-rate, always remaining above efficiencies of 95%, whereas the total efficiency remains, for any flow-rate of the gaseous stream, higher than 99%, indicating that with an increase in the flow-rate of the gaseous stream, the arrangement of swirler elements 14 of FIG. 2 provides a high separation efficiency, even if the stratification at the inlet is not complete, increasingly contributing to the total separation efficiency.

Under the operating conditions, with reference to FIG. 1, the mixture of fluids coming from oil and gas wells, flows into the separator through the horizontal pipe 2, with a bubble or slug or annular flow regime. The mixture flows through the connection gate 3 into a pipe 4 with a larger section. The increase in the flow diameter allows a substantial reduction ($\geq 50\%$) in the velocity of the mixture. This effect, coupled with a possible slight downward inclination of the pipe ($\leq 10°$ with respect to the horizontal), allows the damping of the slug flow of the stream at the inlet and leads to stratified flow conditions. The mixture, thus stratified, enters the cylindrical body of the separator 6, tangentially at a low velocity through the inlet 5. The stratification effect together with the inertial force, ensures that, in the cylindrical body of the separator 6, the heavier liquid phase hits the walls of the separator at a low velocity and flows with a circular motion following the walls, towards the bottom of the separator 7, without generating an excessive fragmentation of the liquid stream, whereas the gas entrapped in the liquid tends to be released, being conveyed centrally in the cylindrical body, and to rise, together with the gas already separated by stratification, inside the main body towards the upper part of the separator 9 (primary liquid separation). The combination of the two effects leads to a high primary separation efficiency. The liquid droplets still entrapped in the gaseous stream can be further removed by optionally conveying the gaseous phase previously separated inside an arrangement of finishing elements 11 (secondary liquid separation). The degassed liquid phase leaves the bottom of the separator 7 through the outlet pipe of the liquid 12, whereas the gaseous phase exits through the gas outlet pipe 13.

The compact inertial gas-liquid separation system, according to what is specified, proves to have a reduced encumbrance volume (about ¼) with respect to a conventional separator with the same operative specifications.

It should be noted that the length of the inlet pipe and the optimum height of the bottom of the separator depend on the operative conditions of the system (gas flow-rate, liquid flow-rate, pressure, flow regime); their dimensions are therefore determined from case to case.

The invention claimed is:

1. A compact inertial separation system of a gas-liquid mixture comprising:
    a stratification device to stratify a multiphase fluid stream at an inlet;
    a cylindrical body in which gas-liquid inertial separation is performed;
    two outlet devices of separated gas and liquid streams which are respectively inserted on an upper base and lower base of the cylindrical body;
    wherein the stratification device includes a first pipe and a second pipe having a larger diameter with respect to the first pipe, the second pipe being connected by a connection gate to the first pipe, the second pipe being tilted with respect to the horizontal, an inclination and an increase in a section diameter between the two pipes inducing stratification of the multiphase stream; and
    wherein the stratification device is tangentially inserted on the cylindrical body, at a height with respect to the lower base; the height being a minimum that guarantees an efficient inertial separation of the stream already previously stratified in the stratification device.

2. The compact inertial separation system according to claim 1, wherein the upper base of the cylindrical body comprises an installation of finishing separator elements to eliminate liquid droplets entrapped in the gas.

3. The compact inertial separation system according to claim 1, wherein the inclination angle is lower than or equal to 10°.

4. The compact inertial separation system according to claim 1, wherein the stratification device stratifies the multiphase stream, which is a fluid stream having bubble, slug, or annular flow regime, at the inlet.

5. A method for separation of a gas-liquid mixture relating to a compact inertial system, comprising:
    performing induction of a stratified flow of a mixture of fluids with a bubble, slug, or annular flow regime at an inlet of a stratification device comprising a first pipe and a second pipe having a larger diameter with respect to the first pipe, the second pipe being connected by a connection gate to the first pipe;
    damping of slug flow regime of the mixture of fluids at the inlet by reduction of 50% of inlet velocity combined with a downward inclination of the second pipe of ≤10° with respect to the horizontal; and
    performing inertial gas-liquid separation by tangentially conveying at a low velocity the stratified stream inside a cylindrical body, by a low-velocity impact against walls of the cylindrical body so as to prevent its excessive fragmentation, with the generation of:
        a circular flow of a heavier liquid phase along walls of the cylindrical body in a direction of a bottom of the separator towards a first outlet of the separator; and
        further release of bubbles of gas still entrapped in the liquid phase which tend to separate, moving into a central part of the cylindrical body, and rising centrally, together with the gas already separated by stratification, in a direction of a second outlet.

6. The method for separation of a gas-liquid mixture relating to the compact inertial system according to claim 5, wherein the liquid droplets still entrapped in the gaseous stream are further removed by conveying the gaseous phase, previously separated by stratification and by inertia, through finishing elements operating by centrifugal force or coalescence, situated before the outlet through the second outlet.

* * * * *